United States Patent [19]

Owens

[11] 4,108,458
[45] Aug. 22, 1978

[54] PULL OUT-STEP

[76] Inventor: Charles Owens, 412 Neal St., Baytown, Tex. 77520

[21] Appl. No.: 750,966

[22] Filed: Dec. 15, 1976

[51] Int. Cl.² .............................................. B60R 3/02
[52] U.S. Cl. .................................. 280/166; 105/449; 182/90
[58] Field of Search .................. 280/166, 163, 164 R, 280/164 A; 182/88, 90, 100; 105/44.9; D12/203

[56] References Cited

U.S. PATENT DOCUMENTS

| 1,017,096 | 2/1912 | Harris et al. | 280/164 A |
| 1,154,228 | 9/1915 | Bauman | 280/164 A X |
| 2,458,618 | 1/1949 | McDonald | 182/88 |
| 2,583,894 | 1/1952 | Shuck | 280/166 |
| 3,229,993 | 1/1966 | Riddle | 280/166 |
| 3,403,926 | 10/1968 | Way et al. | 280/166 |
| 3,584,704 | 6/1971 | Eckmann | 182/90 |

Primary Examiner—Evon C. Blunk
Assistant Examiner—Michael J. Forman

[57] ABSTRACT

This device consists primarily of a pipe which telescopingly receives a rod having a foot guard attached at one end. The device includes a plate welding to the pipe which bolts to the truck body, and the opposite end of the pipe is welded to a plate which abuts with the lower portion of the front fender of the truck. A rubber gasket on the assembly, serves as friction means, against the rod so as to prevent it from sliding outwards of the vehicle, when it is in motion.

1 Claim, 3 Drawing Figures

PULL OUT-STEP

This invention relates to devices for automotive vehicles, and, more particularly, to a pull-out step.

It is, therefore, the principal object of this invention to provide a pull-out step, which will enable a person to reach out to the center of the windshield, in order to clean it easily. Most late model trucks are too high to reach across the windshield, without using a box or other structure to stand on.

Another object of this invention is to provide a device of the type described which will enable a person to reach the hood and top of a pick-up truck, and will not detract from the outside appearance of the truck.

A further object of this invention is to provide a device of the type described, which will be safe in use.

Other objects of the invention are to provide a pull-out step, which is simple in design, inexpensive to manufacture, rugged in construction, easy to use and efficient in operation.

These, and other objects, will be readily evident, upon a study of the following specification, and the accompanying drawing, wherein.

Figure 1:
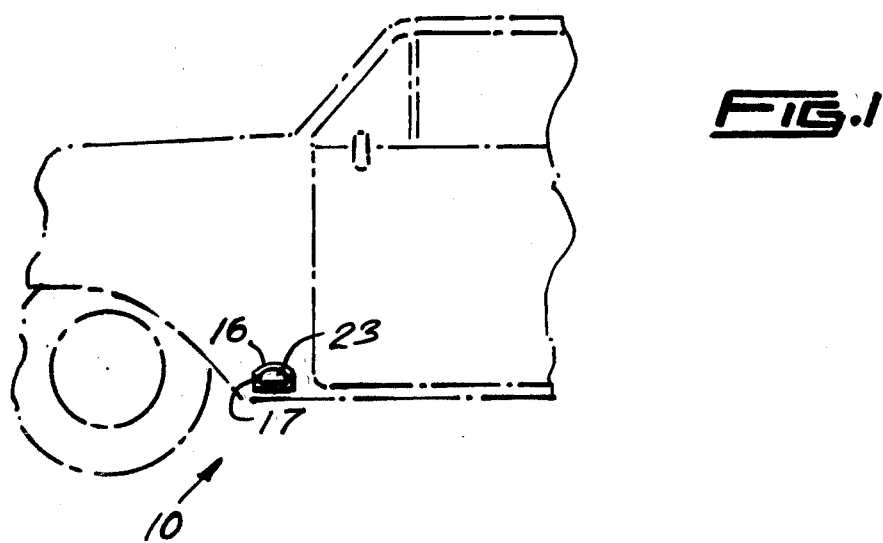
FIG. 1 is a fragmentary and phantom side view of a vehicle, showing the present invention installed thereon.
Figure 2:
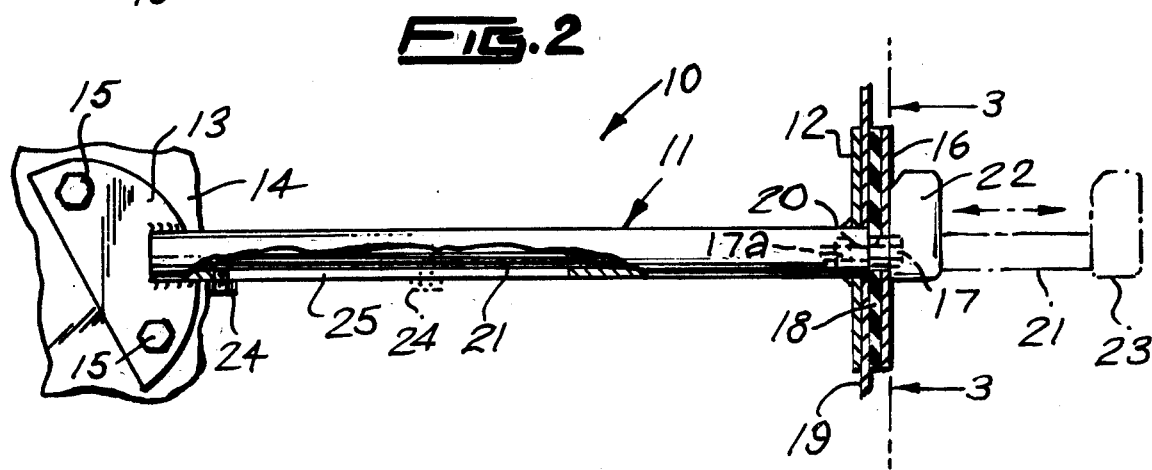
FIG. 2 is an enlarged side view of the present invention, shown partly broken away.
Figure 3:
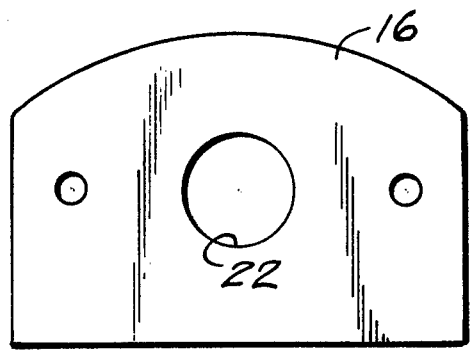
FIG. 3 is an enlarged view, taken along the line 3—3 of FIG. 1.

According to this invention, a pull-out step 10 is shown to include a hollow pipe 11, to which is fixedly secured, by welding, a plate 12 at one end. A plate 13 is welded and offset at the opposite end, and is secured to truck body 14, by suitable fasteners 15.

A plate 16 is secured, by fasteners 17 and 17a, to a rubber gasket 18, and the lower portion of the front fender 19. Within the opening 20 of gasket 18, a rod 21 is frictionally received, so as to prevent the rod 21 from moving outwards when the vehicle is in motion. Rod 21 is freely and slidably received within the opening 22 of plate 16.

A set screw 24 is secured fixedly in rod 21 and set screw 24 is freely and slidably received within elongated slot 25 of pipe 11. Set screw 25 serves as stop means against the end of the slot 25, so as to prevent rod 21 from coming out of pipe 11.

It shall be noted, that gasket 18 abuts with both the lower portion 19 of the front fender, and the plate 16.

When it is desired to use device 10, it is grasped by plate 23, secured to an end of the rod 21 and pulled outwards from the vehicle, so as to enable the user to step upwards. After use, the plate 23 is urged back towards the vehicle, the plate then being in abuttment with plate 16.

While various changes may be made in the detail construction, it is understood that such changes will be within the spirit and scope of the present invention, as is defined by the appended claims.

What I now claim is:

1. A pull-out step for an automotive vehicle, comprising in combination, a length of pipe, which is received within an opening provided in the lower portion of a front fender of a vehicle, and an opening in a first plate, and one end of said pipe is flush with the outside of said fender, said first plate being in abutment with the inner side of said fender, said pipe being welded to an off-set second plate that is secured rigidly to the chassis of the vehicle by suitable fasteners, a rod slidably received in said pipe, said rod being extendible outward from the exterior of said fender, and a third plate is fixedly secured to the end of the said rod, which extends out of said pipe, and a flat rubber gasket is fixedly secured to said fender and is provided with an opening smaller than the diameter of said rod, so as to retain said rod frictionally against sliding in or out of said pipe when not in use, and a set screw secured in said rod is slidable within a slot of said pipe and prevents rotation of said rod, and when urged against an end of said slot, provides linear stop means for said rod, when it is pulled out of said pipe.

* * * * *